G. W. Cole.
Corn-stalk Cutter.
№ 39,214.   Patented July 14, 1863.

Witnesses:
J. W. Coombs
G. W. Reed

Inventor
G. W. Cole
per Munn & Co.
Attorneys

UNITED STATES PATENT OFFICE.

G. W. COLE, OF CANTON, ILLINOIS.

IMPROVEMENT IN CORNSTALK-CUTTERS.

Specification forming part of Letters Patent No. 39,214, dated July 14, 1863.

*To all whom it may concern:*

Be it known that I, G. W. COLE, of Canton, in the county of Fulton and State of Illinois, have invented a new and Improved Machine for Cutting Standing Cornstalks; and I do hereby declare that the following is a full, clear, and exact description of the same, reference being had to the accompanying drawings, making a part of this specification, in which—

Figure 1:
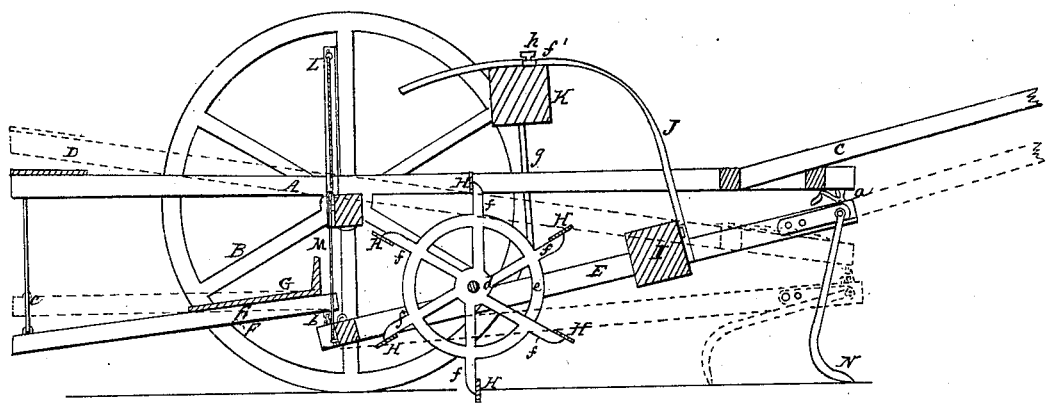
Figure 2:
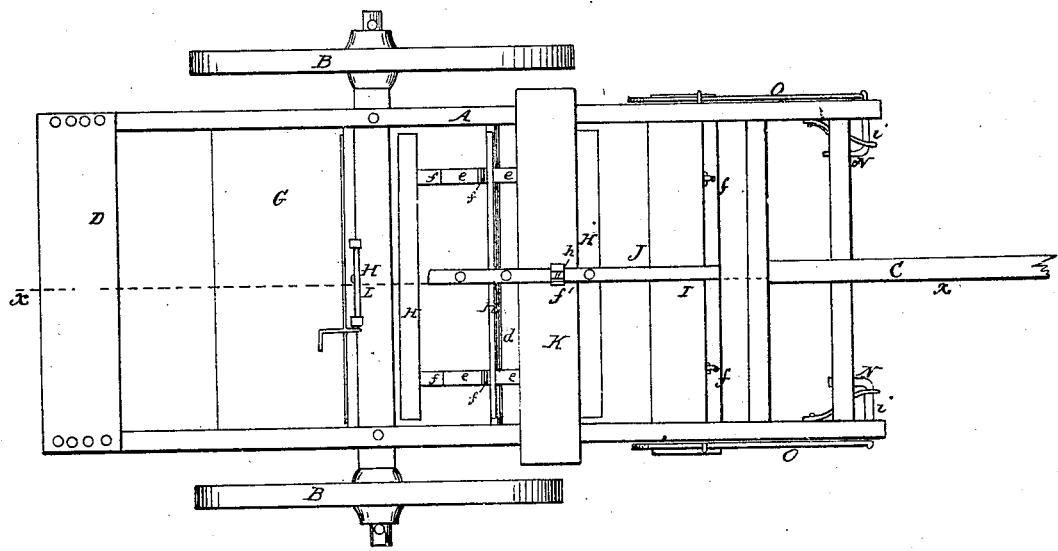

Figure 1 is a side sectional view of my invention, taken in the line $x\,x$, Fig. 2; Fig. 2, a plan or top view of the same.

Similar letters of reference indicate corresponding parts in the two figures.

The invention relates to a new and improved machine for cutting up standing cornstalks on the field; and it consists in the employment or use of a rotary cutter-wheel fitted within a swinging frame which is provided with an adjustable weight, in combination with a supplemental swinging frame which is connected to the swinging cutter-frame, both of the swinging frames being suspended within a frame mounted on wheels, and all arranged substantially as hereinafter described.

The invention also consists in the employment or use of gathering-hooks in connection with springs, as hereinafter fully shown and described; and, further, in the employment or use of a windlass attached to the main frame of the machine for the purpose of raising the swinging frames and elevating the rotary cutter above the surface of the ground when said cutter is not required for use—as, for instance, in drawing the machine from place to place, in turning the same, &c.

To enable those skilled in the art to fully understand and construct my invention, I will proceed to describe it.

A represents a horizontal rectangular frame, which is mounted on two wheels, B B, and has a draft-pole, C, attached to its front end.

D represents the driver's seat, which is on the back end of the frame A; and E is a swinging frame of rectangular form, and attached at its front end to the front end of the frame A by joints or hinges $a$. The back end of the swinging frame E is connected by joints $b$ to the inner or front end of a swinging frame, F, the back or outer end of which is suspended by rods $c\,c$ from the back end of the frame A. On the front part of the frame F there is placed a foot-board, G, to receive the feet of the driver on seat D.

Within the frame E there is fitted a shaft, $d$, on which two heads, $e\,e$, are placed and firmly keyed. These heads $e$ are each provided with radial arms $f$, to which cutters H are attached, said cutters being parallel with the shaft $d$ and extending beyond the heads $e$, so as to be nearly equal in length to the width of the frame E. This cylinder of cutters is allowed to rotate freely in the frame E, and on the latter frame there is secured a bar, I, which is designed to serve as a weight. To this bar I there is attached a curved rod, J, which extends upward, as shown in Fig. 1, and passes through a staple, $f'$, which is driven into the center of a bar, K, the ends of which have pendent rods $g\,g$ attached to it, said rods being fitted at their lower ends in the sides of the frame E and allowed to turn freely therein. The staple $f'$ of the bar K is allowed to slide freely on the rod J, and the bar K may be retained or held at any desired point by a pin, $h$, which passes through the staple $f'$ and rod J and into the bar. The rod J is perforated with a number of holes to admit of the adjustment of the bar K at various points, as may be desired.

L is a windlass, the frame of which is attached to the axle of the wheels B B. The cord or rope M of this windlass is attached to the inner end of the frame E. (See Fig. 1.)

To the front end of the frame E there are attached two pendent hooks, N N, one at each side. These hooks are curved outward or toward the front of the machine and nearly or quite touch the surface of the earth as the machine is drawn along. These hooks have their shanks bent in a horizontal position at their upper ends, as shown at $i\,i$, and said parts $i\,i$ pass through the front part of the frame E, and are allowed to turn freely therein. The outer ends of the parts $i\,i$ of the shanks of the hooks have each a spring, O, attached to them, and said springs have a tendency to keep the hooks N in a downward position, or to their work, as indicated in red in Fig. 1, the frame A, when the machine is at work, having an inclined position.

The operation is as follows: As the machine is drawn along the hooks N N will gather the lodged stalks in line with the rotary cylinder of cutters and enable the latter to cut the stalks into pieces as they pass over them. The cutters have a sufficient pressure given them to perform this work by means of the bar K, which may be adjusted in a more or less backward position, and secured at any desired point within the scope of its movement by means of the pin $h$, which passes through the staple $f'$ and rod J, as previously described. The further backward the bar K is adjusted the greater will be the pressure given the cutters, and in case at any time a greater pressure should be required than the bar K can give the driver can supply the deficiency by pressing with his feet upon the foot-board G. Thus the work may be done in an efficient and thorough manner. The hooks N N are allowed, in consequence of the attachment of the springs O O to them, to yield or to give to any obstructions that may lie in their path. They are therefore prevented from being injured by that means.

In moving or transporting the machine from place to place the hooks N N are turned backward and upward and retained in an elevated state above the earth by hooks $j$, attached to the bar I, and the inner ends of both the frames E F are elevated so as to raise the cutters above the surface of the earth by means of the windlass L.

The adjustment of the bar K also serves to balance the frame A, counterpoising the weight of the driver on seat D. The cylinder of cutters, it will be understood, turn without any extraneous power being applied to it, its own traction being sufficient for the purpose.

I do not claim separately the cylinder of cutters, for they have been previously used; nor do I claim the hooks N N separately or in themselves considered; but,

Having thus described my invention, what I do claim as new, and desire to secure by Letters Patent, is—

1. The combination of the two swinging or adjustable frames E F, attached to the frame A and to each other, as shown, and provided respectively with the cylinder of cutters H and the foot-board G, arranged substantially as and for the purpose herein set forth.

2. The adjustable bar or weight I, applied to the frame E, substantially as shown, and used in connection with the curved rod J, staple $f'$, and pin $h$, or an equivalent fastening, for the purpose herein set forth.

3. The adjustable hooks N N, in combination with the springs O O, arranged substantially as and for the purpose set forth.

4. The windlass L, applied to the frame A, in combination with the frames E F, for the purpose specified.

G. W. COLE.

Witnesses:
WM. PARLIN,
T. C. DUNLAP.